Patented June 21, 1932

1,863,650

UNITED STATES PATENT OFFICE

EDGAR ANDREW BOLTON AND TOM FREDERICK GRAY, OF ADSWOOD, STOCKPORT, ENGLAND, ASSIGNOR TO VICTORY VALVES LIMITED, OF ADSWOOD, STOCKPORT, ENGLAND

PARALLEL SLIDE VALVE

Application filed August 28, 1931, Serial No. 560,038, and in Great Britain April 30, 1931.

This invention relates to parallel slide valves, and particularly to the valve discs carried by the sliding spindle, and has for its object to provide an improved construction and arrangement of the means by which the valves or valve discs are pressed away from one another on to their seats; also improved means for holding the valves or valve discs in position upon the spindle, such means permitting of the ready withdrawal of the discs for inspection or renewal purposes.

The invention comprises the provision of a recess in a boss like projection upon the back of each valve and of a volute spring in such recess which bears upon a metal pad, the outer face of which is rounded, the rounded faces of the pads of the two valve discs bearing upon one another, the valve operating means surrounding the boss like projections containing the springs and pads of the valves.

The invention further comprises the arrangement wherein each pad fits into the back of its valve disc in a bayonet joint like manner.

The invention further comprises the arrangement of the valve discs operating means in the form of a belt eye with a fixed part secured upon the valve spindle, and two movable parts, each pivoted to the fixed part, the one from above and the other from below, the meeting faces of the movable parts forming a boss which is externally threaded and receives a cap which has a central hole therein through which project the divided ends of a split pin, the head of which is held in a recess between the said meeting faces.

Referring to the accompanying explanatory drawings:—

The same reference letters in the three views indicate the same parts.

Figure 1:
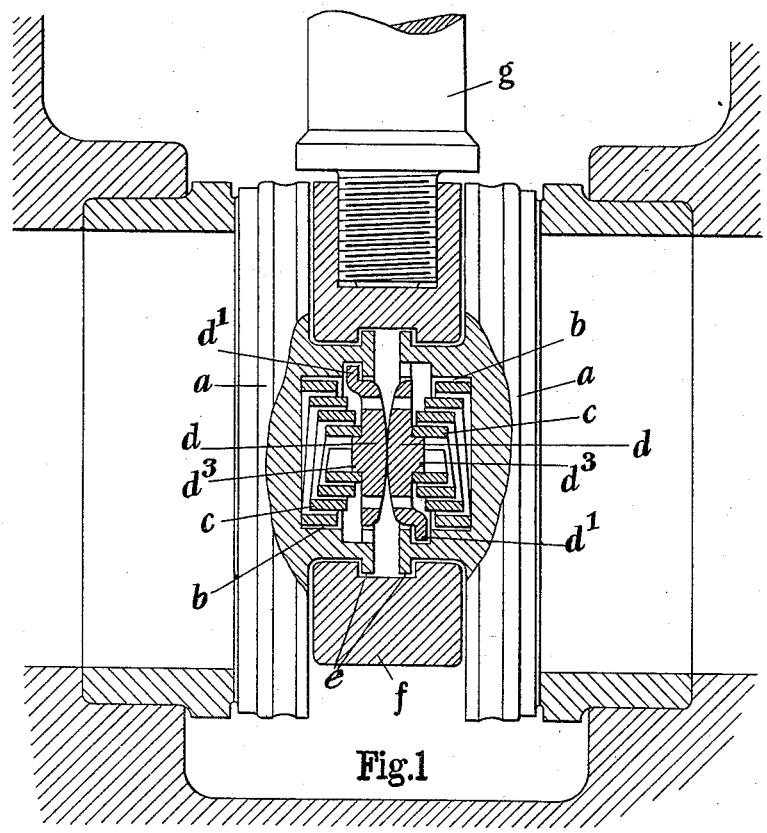
Figure 1 is a sectional elevation through the valve discs of a parallel slide valve showing a construction in accordance with our invention.
Figure 2:
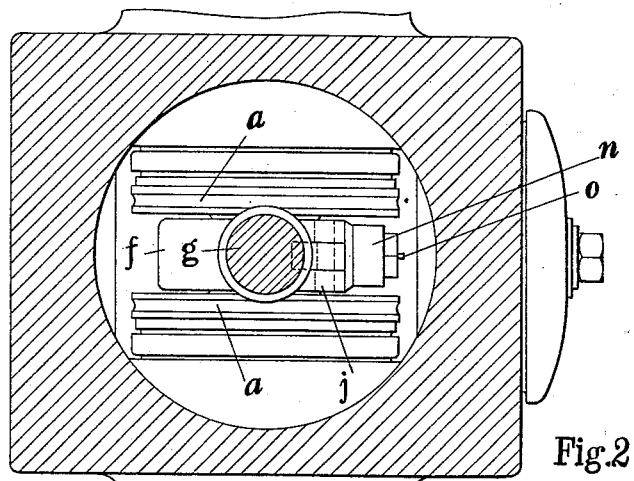
Figure 2 is a sectional plan view on the line 2—2 of Figure 3.

In accordance with our invention, each valve disc $a$ has a recess $b$ in its back in which is located a volute spring $c$ which bears upon a metal pad $d$, the outer face of which is rounded, as shown in Figure 1. The rounded faces of the pads in the two valve discs bear upon one another, each disc being separately sprung. The pads $d$ have projections $d^1$ upon their peripheral edges, which are passed through slots $d^2$ around the hole through which the pad projects, the pad being then given a partial turn whereby it is held in the disc in a bayonet joint like manner against the pressure of its spring $c$ which is preferably composed of flat coils, as shown, the end of which embraces a central projection $d^3$ on the pad so as to cause it to press outwards with an even pressure over its surface.

Figure 3:
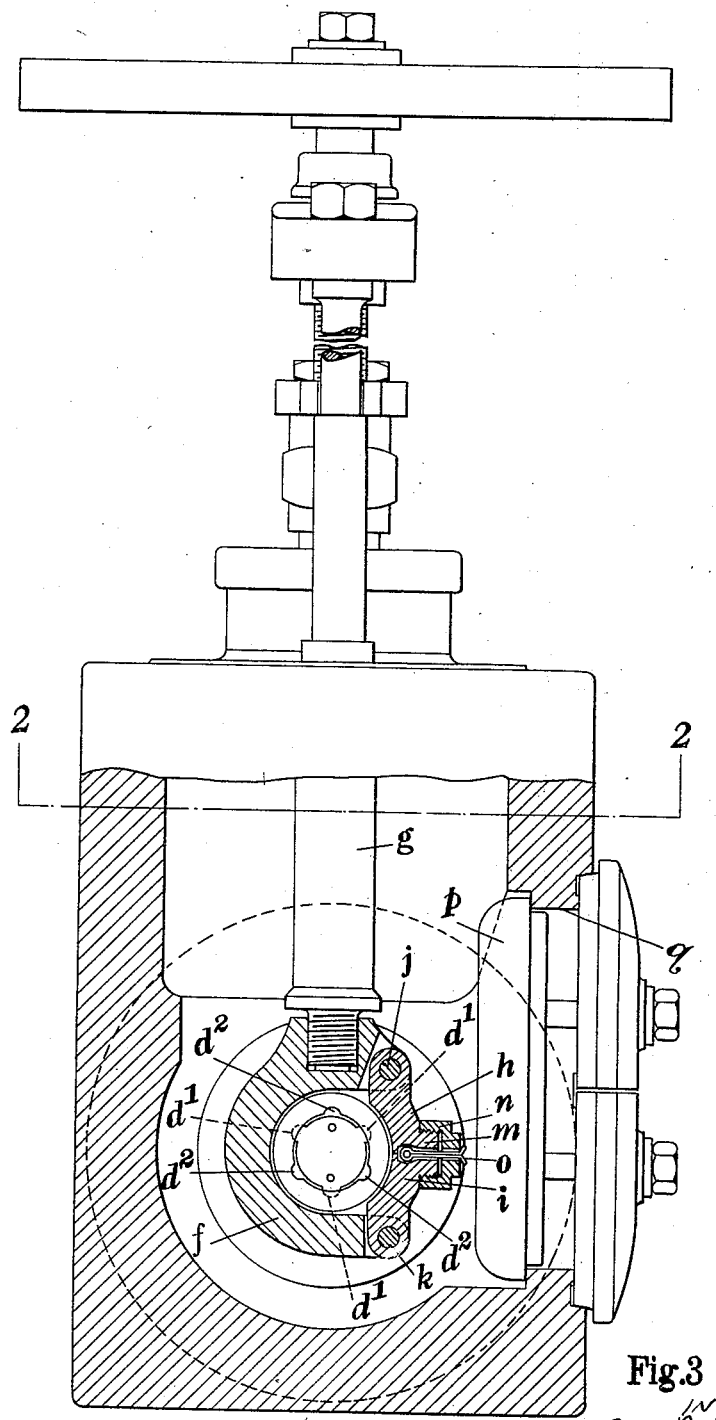
Figure 3 is a sectional elevation at right angles to Figure 1.

The boss like projecting part $e$ of each valve disc (in which the spring holding recess is located) rests within a belt eye $f$ upon the valve spindle $g$ which actuates the valve discs. The part of the belt which is movable to permit of the insertion of the valves into and their withdrawal from the eye is made in the form of two pivotal members $h$, $i$, one pivoted to the belt eye $f$ from above at $j$ and the other from below at $k$, and the meeting faces of the members $h$ and $i$ when the two parts are in their service position as shown in Figure 3, form a boss like projection $m$ which is externally threaded to receive a cap $n$. A split pin $o$ is inserted in a slot in the meeting faces of the members $h$ and $i$, the split end projecting so that it extends through a hole in the cap $n$, when the latter is screwed home. By opening out the split ends over the cap, as shown in Figure 3, the cap is firmly held against movement and so release of the movable parts $h$ and $i$ of the belt eye is prevented except when such is desired.

The valve body is provided with an internal cover piece $p$ which closes an aperture $q$ through which the valve discs $a$ can be inspected, withdrawn and replaced.

What we claim is:—

1. In parallel slide valves, the provision of a recess in a boss like projection upon the back of each valve and of a volute spring in such recess which bears upon a metal pad, the outer face of which is rounded, the rounded faces of the pads of the two valve discs bearing upon one another, the valve operating means surrounding the boss like projections containing the springs and pads of the valves.

2. In parallel slide valves as claimed in claim 1, the arrangement wherein each pad fits into the back of its valve disc in a bayonet joint like manner.

3. In parallel slide valves as claimed in claim 1, the arrangement wherein each volute spring is made of flat coils which embrace a central projection upon its pad.

4. In parallel slide valves, the arrangement of the valve disc operating means in the form of a belt eye with a fixed part secured upon the valve spindle, and two movable parts, each pivoted to the fixed part, the one from above and the other from below, the meeting faces of the movable parts forming a boss which is externally threaded and receives a cap which has a central hole therein through which project the divided ends of a split pin, the head of which is held in a recess between the said meeting faces.

In testimony whereof we have signed our names to this specification.

TOM FREDERICK GRAY.
EDGAR ANDREW BOLTON.